United States Patent
Kosugi

(10) Patent No.: US 11,404,883 B2
(45) Date of Patent: Aug. 2, 2022

(54) CHARGING APPARATUS, CHARGING PROGRAM, AND CHARGING METHOD

(71) Applicant: GBS CORPORATION, Tokyo (JP)

(72) Inventor: Tadatsugu Kosugi, Tokyo (JP)

(73) Assignee: GBS Corporation, Tokyo (JP)

( * ) Notice: Subject to any disclaimer, the term of this patent is extended or adjusted under 35 U.S.C. 154(b) by 191 days.

(21) Appl. No.: 15/523,091

(22) PCT Filed: Oct. 9, 2015

(86) PCT No.: PCT/JP2015/079390
§ 371 (c)(1),
(2) Date: Apr. 28, 2017

(87) PCT Pub. No.: WO2016/067941
PCT Pub. Date: May 6, 2016

(65) Prior Publication Data
US 2017/0324262 A1    Nov. 9, 2017

(30) Foreign Application Priority Data

Oct. 28, 2014  (JP) .............................. JP2014-219169

(51) Int. Cl.
*H02J 7/00* (2006.01)
*H01M 10/44* (2006.01)
(Continued)

(52) U.S. Cl.
CPC ............. *H02J 7/00* (2013.01); *H01M 4/5825* (2013.01); *H01M 10/0525* (2013.01);
(Continued)

(58) Field of Classification Search
CPC ...... H02J 7/0052; H02J 7/0042; H02J 7/0081; H02J 7/0077; H02J 7/0421; H02J 7/045;
(Continued)

(56) References Cited

U.S. PATENT DOCUMENTS

| 5,886,527 A | 3/1999 | Ito |
| 2006/0188787 A1* | 8/2006 | Nakanishi ........... H01M 4/5825 |
| | | 429/324 |

(Continued)

FOREIGN PATENT DOCUMENTS

| JP | 09-073923 | 3/1997 |
| JP | 2001186684 | 7/2001 |

(Continued)

*Primary Examiner* — David V Henze-Gongola
(74) *Attorney, Agent, or Firm* — Verrill Dana, LLP

(57) ABSTRACT

A charging apparatus, a charging method, and the like that can prevent deterioration in a battery by appropriate current adjustment and shorten charging time are provided. A charging apparatus (1) performs charging of a battery (31) with a constant current until a voltage of the battery (31) reaches a predetermined voltage and, after the predetermined voltage is achieved, performs charging of the battery (31) while controlling the current so as to keep the voltage constant. A deterioration measuring unit (31) detects a deterioration condition in the battery (31). A current and voltage adjusting unit (11) specifies an additional current in accordance with the deterioration condition. A power supplying unit (12) supplies the additional current to the battery (31) in addition to the constant current. Such a deterioration condition is (Continued)

specified by a voltage difference or a temperature difference detected by supplying a single amount of current for a certain period.

6 Claims, 10 Drawing Sheets

(51) Int. Cl.
  *H01M 4/58* (2010.01)
  *H01M 10/0525* (2010.01)
  *H01M 10/48* (2006.01)
(52) U.S. Cl.
  CPC ......... *H01M 10/44* (2013.01); *H01M 10/443* (2013.01); *H01M 10/486* (2013.01); *H02J 7/0042* (2013.01); *H02J 7/0091* (2013.01); *H01M 2220/30* (2013.01)
(58) Field of Classification Search
  CPC .... H02J 7/044; H02J 7/047; H02J 2007/0039; H02J 2007/0037; H01M 4/5825; H01M 10/0525; H01M 10/44; H01M 10/486; H01M 2220/30
  See application file for complete search history.

(56) References Cited

U.S. PATENT DOCUMENTS

| | | | |
|---|---|---|---|
| 2008/0197813 A1 | 8/2008 | Asakura et al. | |
| 2009/0112496 A1* | 4/2009 | Suzuki | H02J 7/0022 702/63 |
| 2010/0085009 A1* | 4/2010 | Kang | H02J 7/0016 320/118 |
| 2013/0282316 A1* | 10/2013 | Goto | H01M 10/486 702/63 |
| 2014/0009123 A1 | 1/2014 | Park et al. | |
| 2014/0191731 A1* | 7/2014 | Miura | H01M 10/44 320/157 |

FOREIGN PATENT DOCUMENTS

| | | | | |
|---|---|---|---|---|
| JP | 2008204800 A | 9/2008 | | |
| JP | 2009112113 | 5/2009 | | |
| JP | 2012235551 | 11/2012 | | |
| JP | 2014158312 A * | 8/2014 | ........... | H02J 7/0029 |
| JP | 2014519016 | 8/2014 | | |
| WO | WO0727495 | 7/1997 | | |
| WO | WO 2014029880 A3 * | 9/2014 | ........... | A24F 47/008 |

* cited by examiner

FIG. 3

<PERIOD SPECIFYING INFORMATION>

| INITIAL PERIOD | a1 volt(s) to a2 volt(s) |
|---|---|
| ADDABLE PERIOLD | a3 volt(s) to a4 volt(s) |
| TERMINAL PERIOLD | a5 volt(s) to a6 volt(s) |

FIG. 4

CURRENT ADJUSTMENT DATA BASED ON DETERIORATION TESTS (a) <CURRENT ADJUSTMENT DATA BASED ON VOLTAGE CHANGES>

| RANGES OF INCREASED VOLTAGE | ADDITIONAL CURRENT VALUES |
|---|---|
| b1 volt(s) to b2 volt(s) | b7 ampere(s) |
| b3 volt(s) to b4 volt(s) | b8 ampere(s) |
| b5 volt(s) to b6 volt(s) | b9 ampere(s) |

(b) <CURRENT ADJUSTMENT DATA BASED ON TEMPERATURE CHANGES>

| RANGES OF INCREASED TEMPERATURE | ADDITIONAL CURRENT VALUES |
|---|---|
| c1 degree(s) to c2 degrees | c7 ampere(s) |
| c3 degree(s) to c4 degrees | c8 ampere(s) |
| c5 degree(s) to c6 degrees | c9 ampere(s) |

FIG. 5

ADDITIONAL CURRENT VALUES
BASED ON PREVIOUS VOLTAGE DIFFERENCE (a)

<PREVIOUS VOLTAGE VARIATION>

| PREVIOUS VOLTAGE DIFFERENCE | f3 (volt(s)) |
|---|---|

(b)

<ADDITIONAL CURRENT DATA>

| VARIATION RANGES BETWEEN PREVIOUS AND PRESENT TESTS | ADDITIONAL CURRENT VALUES |
|---|---|
| d1 volt(s) to d2 volt(s) | d7 ampere(s) |
| d3 volt(s) to d4 volt(s) | d8 ampere(s) |
| d5 volt(s) to d6 volt(s) | d9 ampere(s) |

FIG. 6

ADDITIONAL CURRENT VALUES
BASED ON PREVIOUS TEMPERATURE DIFFERENCE (a)

<PREVIOUS TEMPERATURE DIFFERENCE>

| PREVIOUS TEMPERATURE VARIATION | f5 (degree(s)) |
|---|---|

(b)

<ADDITIONAL CURRENT DATA>

| VARIATION RANGES BETWEEN PREVIOUS AND PRESENT TESTS | ADDITIONAL CURRENT VALUES |
|---|---|
| e1 degree(s) to e2 degree(s) | e7 ampere(s) |
| e3 degree(s) to e4 degree(s) | e8 ampere(s) |
| e5 degree(s) to e6 degree(s) | e9 ampere(s) |

CHARGING APPARATUS, CHARGING PROGRAM, AND CHARGING METHOD

TECHNICAL FIELD

The present invention relates to a charging apparatus, a charging program, and a charging method and, in particular, to a charging apparatus, a charging method, and the like capable of shortening charging time by fast charging.

BACKGROUND ART

Mobile terminals including smartphones are presently widespread among the general public. Such a mobile terminal has a built-in battery, and a secondary battery that can be used repeatedly by charging is used as the battery. Shorter charging time is more preferable for this secondary battery. Since such a mobile terminal is carried around by its owner, the need for long charging time may lead to a situation in which the owner carries around the mobile terminal without sufficiently charging the battery of the mobile terminal.

In order to reduce the charging time, a large current may be supplied through the secondary battery within a short period of time. However, this causes the damage of the secondary battery and thus the deterioration thereof due to the electrode structure thereof or the nature of the electrolytic liquid thereof. Thus, the life of the battery is disadvantageously shortened.

In order to solve this problem, a charging mode called a constant current and constant voltage mode has been widely used. As shown in a graph of FIG. 10, the constant current and constant voltage mode refers to a method of performing charging with a constant current until a voltage of a battery reaches a predetermined voltage and thereafter performing charging while controlling the current so as to keep the voltage constant (Non-Patent Literature 1).

According to the constant current and constant voltage mode, the current is adjusted so as not to deteriorate the battery, thus increasing the life of the battery.

CITATION LIST

Patent Literature

Non Patent Literature 1:
http://detail.chiebukuro.yahoo.co.jp/qa/question_detail/q14
86101084/Yahoo Chiebukuro about CCCV charging/the
date of search: Oct. 23, 2014

SUMMARY OF INVENTION

Technical Problem

While the constant current and constant voltage mode supplies a constant current until a predetermined voltage is achieved as described above, the current does not necessarily need to be constant. If appropriate current adjustment is performed, the battery can be prevented from deteriorating even when the current is increased. In other words, despite that this charging mode has plenty of scope for shortening charging time while preventing the deterioration of the battery, no such a technology has been provided.

The present invention has been made in order to solve such a problem, and an object of the present invention is to provide a charging apparatus, a charging method, and the like that can prevent the deterioration of a battery by appropriate current adjustment and shorten charging time.

Solution to Problem

In order to solve the above problem, the present invention provides a charging apparatus configured to perform charging of a battery with a constant current until a voltage of the battery reaches a predetermined voltage and performs, after the predetermined voltage is achieved, charging of the battery while controlling the current so as to keep the voltage constant, the charging apparatus including: additional current specifying means for specifying a current addable to the constant current in accordance with a deterioration condition in the battery; and additional current charging means for charging the battery with the addable current together with the constant current.

According to the charging apparatus of the present invention, in the charging apparatus configured to perform charging of a battery with a constant current until a voltage of the battery reaches a predetermined voltage and performs, after the predetermined voltage is achieved, charging of the battery while controlling the current so as to keep the voltage constant, a current specified in accordance with a deterioration condition in the battery as well as the constant current are used to charge the battery.

Thus, the battery is charged with the addable current specified in accordance with the deterioration condition in the battery as well as the constant current according to a constant current and constant voltage mode.

In order to solve the above problem, the present invention provides a charging program configured to perform charging of a battery with a constant current until a voltage of the battery reaches a predetermined voltage and perform, after the predetermined voltage is achieved, charging of the battery while controlling the current so as to keep the voltage constant, the program causing a computer to function as: additional current specifying means for specifying a current addable to the constant current in accordance with a deterioration condition in the battery; and additional current charging means for charging the battery with the addable current together with the constant current.

According to the charging program of the present invention, in a charging apparatus that performs charging of a battery with a constant current until a voltage of the battery reaches a predetermined voltage and performs, after the predetermined voltage is achieved, charging of the battery while controlling the current so as to keep the voltage constant, a current specified in accordance with a deterioration condition in the battery as well as the constant current are used to charge the battery.

Thus, the battery is charged with the addable current specified in accordance with the deterioration condition in the battery as well as the constant current according to the constant current and constant voltage mode.

In order to solve the above problem, the present invention provides a charging method of performing charging of a battery with a constant current until a voltage of the battery reaches a predetermined voltage and performing, after the predetermined voltage is achieved, charging of the battery while controlling the current so as to keep the voltage constant, the method performing: an additional current specifying step for causing additional current specifying means to specify a current addable to the constant current in accordance with a deterioration condition in the battery; and an additional current charging step for causing additional current charging means to charge the battery with the addable current together with the constant current.

According to the charging method of the present invention, in a charging apparatus that performs charging of a battery with a constant current until a voltage of the battery reaches a predetermined voltage and performs, after the predetermined voltage is achieved, charging of the battery while controlling the current so as to keep the voltage constant, a current specified in accordance with a deterioration condition in the battery as well as the constant current are used to charge the battery.

Thus, the battery is charged with the addable current specified in accordance with the deterioration condition in the battery as well as the constant current according to the constant current and constant voltage mode.

Advantageous Effects of Invention

According to the present invention, the battery is charged with the addable current specified in accordance with the deterioration condition in the battery as well as the constant current according to the constant current and constant voltage mode.

Thus, the battery can be prevented from deteriorating even when a current larger than that in the conventional constant current and constant voltage mode is caused to flow, and charging time can be shortened as compared to the conventional constant current and constant voltage mode.

BRIEF DESCRIPTION OF DRAWINGS

FIG. 3 is a diagram showing an example of period specifying information.

FIG. 4 is a diagram showing an example of current adjustment data based on deterioration tests.

FIG. 5 is a diagram showing an example of additional current values based on the previous voltage difference.

FIG. 6 is a diagram showing an example of additional current values based on the previous temperature difference.

DESCRIPTION OF EMBODIMENTS

Embodiment

An embodiment of the present invention will be described with reference to the drawings.

Figure 1:
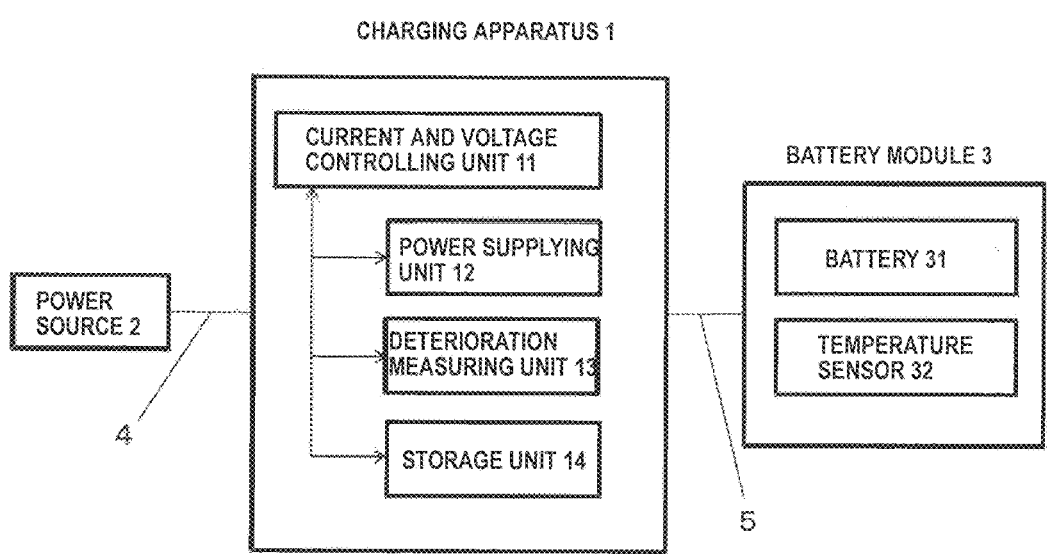
FIG. 1 is a diagram illustrating an example of a hardware configuration according to the present invention.

FIG. 1 is a configuration diagram of a hardware employed in the present invention.

The present invention is composed of: a charging apparatus 1; a power source 2 that supplies electricity to the charging apparatus 1; and a battery module 3 that receives the supply of electricity from the charging apparatus 1. The power source 2 and the charging apparatus 1 are connected to each other with a power-supply cord 4, and the charging apparatus 1 and the battery module 3 are connected to each other with a power-supply cable 5. Note that the power-supply cable 5 is a cable also capable of transmitting and receiving information between the charging apparatus 1 and the battery module 3.

The charging apparatus 1 is composed of: a current and voltage controlling unit 11; a power supplying unit 12; a deterioration measuring unit 13; and a storage unit 14.

The current and voltage controlling unit 11 is a central processing unit (CPU) that includes (but without being limited to) a timing generating circuit, an analog value readout circuit, and the like thereinside. The current and voltage controlling unit 11 receives information from the deterioration measuring unit 13 and the storage unit 14, executes various control on the basis of such information, and transmits an instruction to supply power to the power supplying unit 12.

The power supplying unit 12 receives power from the power source 2, and supplies the power to the battery module 3 on the basis of the instruction from the current and voltage controlling unit 11.

The deterioration measuring unit 13 includes (but without being limited to) a function of detecting a current and a voltage, a filter circuit disposed therearound, and the like. The deterioration measuring unit 13 receives information from a temperature sensor 32, and transmits the information to the current and voltage controlling unit 11.

The storage unit 14 transmits information to the current and voltage controlling unit 11 upon request of information from the current and voltage controlling unit 11. The storage unit 14 also receives information from the current and voltage controlling unit 11 and stores the information therein.

The power source 2 supplies power to the charging apparatus 1.

The battery module 3 is a device such as a mobile phone or a personal computer. The battery module 3 is composed of a battery 31 and the temperature sensor 32.

The battery 31 is a lithium-ion secondary battery. Here, a lithium iron phosphate secondary battery is used as the battery 31. Note however that the battery 31 may be any other battery without being limited thereto. The battery 31 is charged by receiving the supply of power from the charging apparatus 1.

The temperature sensor 32 is used to measure temperature of the battery 31, and transmits the measured temperature to the deterioration measuring unit 13.

Figure 2:
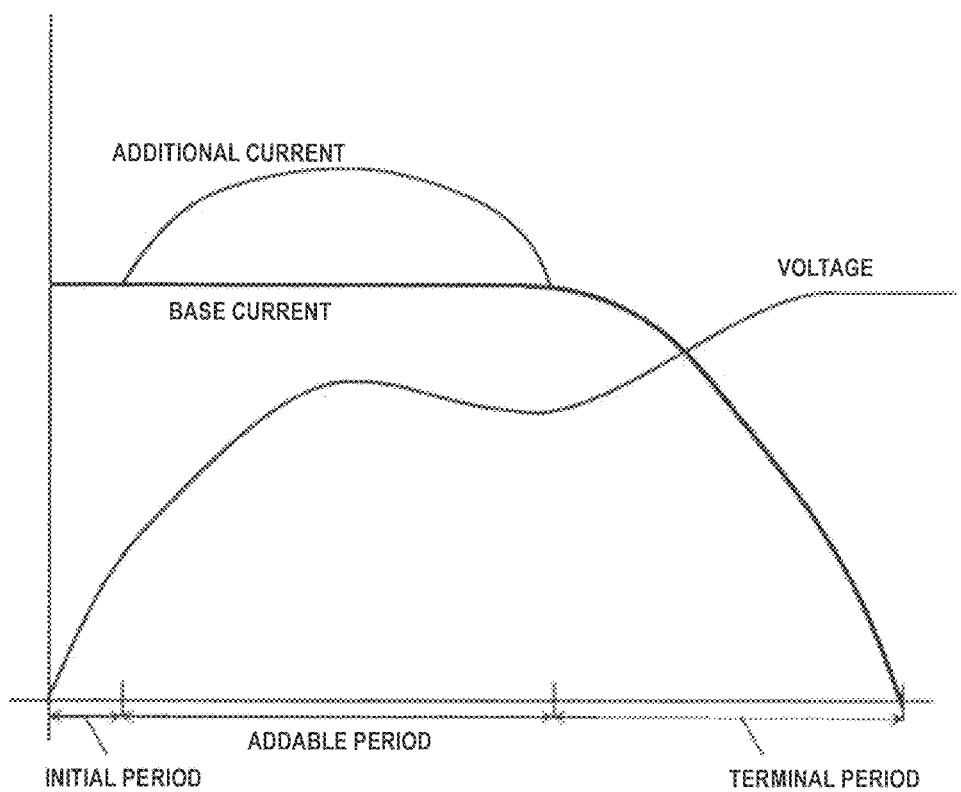
FIG. 2 is a graph showing a relationship between a current and a voltage.

FIG. 2 is a graph showing values of the current and the voltage according to the present invention.

The voltage draws such a curve that the voltage gradually increases. In particular, the voltage draws such a curve that the voltage increases along with an increase in additional current.

Base current is identical with the current shown in the conventional example, and draws the same curve as the conventional example.

The additional current represents a value of current added to the base current. An amount of the additional current is "0" during an initial period. After the initial period ends and an addable period starts, the current gradually increases and then decreases toward a terminal period. The additional current as well as the initial period, the addable period, and the terminal period will be described later in detail.

Data stored in the storage unit 14 will be described next.

FIG. 3 shows period specifying information.

FIG. 3 shows information used to specify timing at which the initial period switches to the addable period. Here, the period during which the voltage falls in a range between "a1 volt(s) and a2 volt(s) (in reality, specific numerical values are assigned to a1 and a2)" corresponds to the initial period. The period during which the voltage falls in a range between "a3 volt(s) and a4 volt(s)" corresponds to the addable period. The period during which the voltage falls in a range between "a5 volt(s) and a6 volt(s)" corresponds to the terminal period.

In the addable period, the current supplied to the battery 31 can be increased. This enables fast charging.

Although the voltage is preferably "not less than 2.6 volts and not more than 3.5 volts" in the addable period, the addable period may be a period of "not less than 2.0 volts and not more than 3.9 volts."

FIG. 4 shows current adjustment data based on deterioration tests. The deterioration test specifies a degree of deterioration in the battery 31 by supplying a constant current through the battery 31 for a fixed time period and then measuring a voltage change or a temperature change in the battery 31 during that time period.

FIG. 4(*a*) shows current adjustment data based on voltage changes. The data is stored with ranges of increased voltage being associated with additional current values. An increased amount in voltage is measured by the deterioration test, an additional current value is extracted from the increased amount, and the obtained value is set as the amount of the additional current.

FIG. 4(*b*) shows current adjustment data based on temperature changes. The data is stored with ranges of increased temperature being associated with additional current values. A temperature change in the battery 31 is measured by the deterioration test, an additional current value is extracted from the amount of the change, and the obtained value is set as the amount of the additional current.

FIG. 5 shows additional current values based on the previous voltage difference.

FIG. 5(*a*) shows a voltage variation in the previous deterioration test.

FIG. 5(*b*) shows data used when obtaining a difference between the voltage variation in the previous deterioration test and a voltage variation in the present deterioration test and specifying an additional current value on the basis of the difference. If the difference is d3 volt(s), for example, a current of d8 ampere(s) is added to the base current (in reality, specific numerical values are assigned to d3 and d8).

FIG. 6 shows additional current values based on the previous temperature difference.

FIG. 6(*a*) shows a temperature variation in the previous deterioration test.

FIG. 6(*b*) shows data used when obtaining a difference between the temperature variation in the previous deterioration test and a temperature variation in the present deterioration test and specifying an additional current value on the basis of the difference. If the difference is e5 degree(s), for example, a current of e9 ampere(s) is added to the base current (in reality, specific numerical values are assigned to e5 and e9).

A processing procedure of the present embodiment will be described next.

Figure 7:
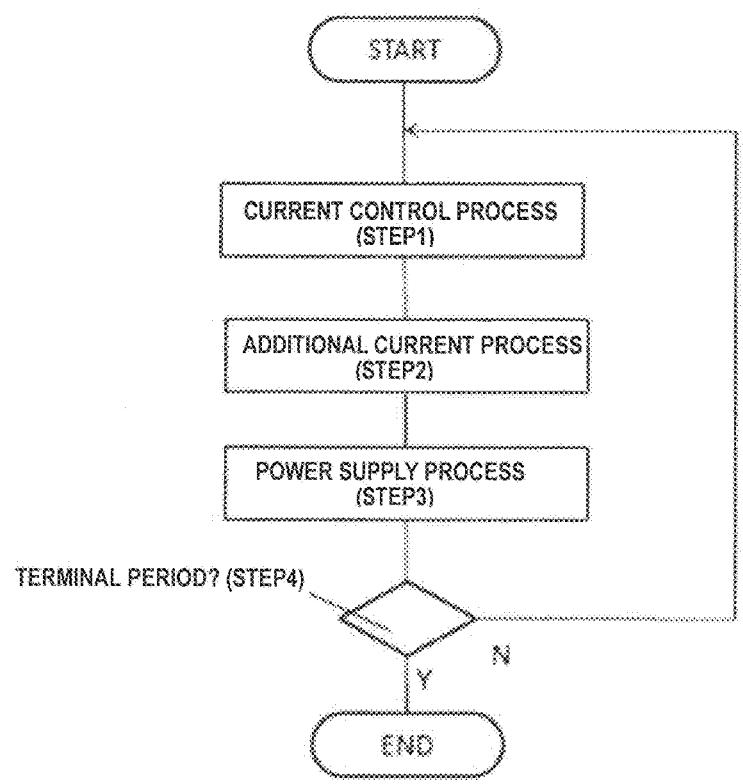
FIG. 7 is a flowchart to implement the present invention.

FIG. 7 shows the processing procedure of the present embodiment. This flowchart is composed of a current control process (STEP1), an additional current process (STEP2), a power supply process (STEP3), and a terminal period checking process (STEP4).

Figure 8:
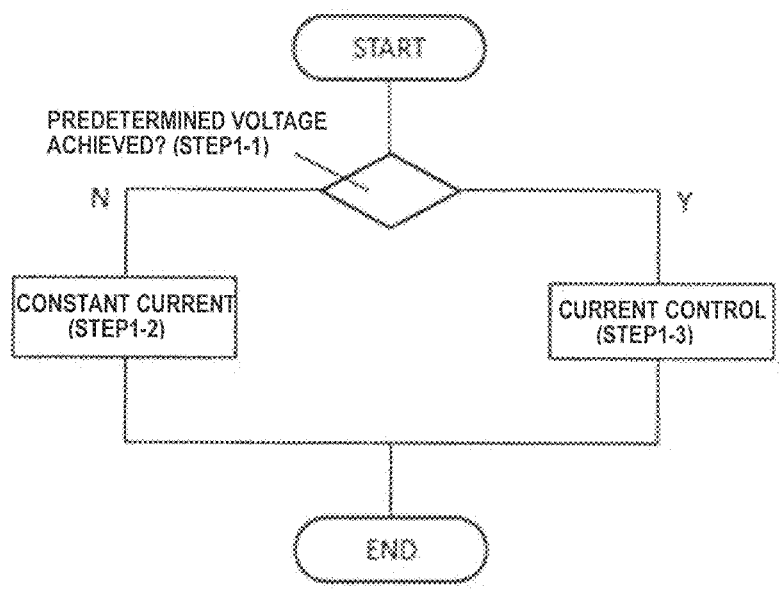
FIG. 8 is a flowchart to show the details of STEP1.

STEP1 is the current control process and the detail thereof is as shown in FIG. 8.

In STEP1-1, the current and voltage controlling unit 11 checks whether a predetermined voltage is achieved. If the voltage is less than the predetermined voltage, the process proceeds to STEP1-2. If the predetermined voltage is achieved, on the other hand, the process proceeds to STEP1-3.

In STEP1-2, the current and voltage controlling unit 11 performs a process of making a charging current constant.

In STEP1-3, the current and voltage controlling unit 11 performs a process of controlling the current so as to make the voltage constant.

Figure 9:
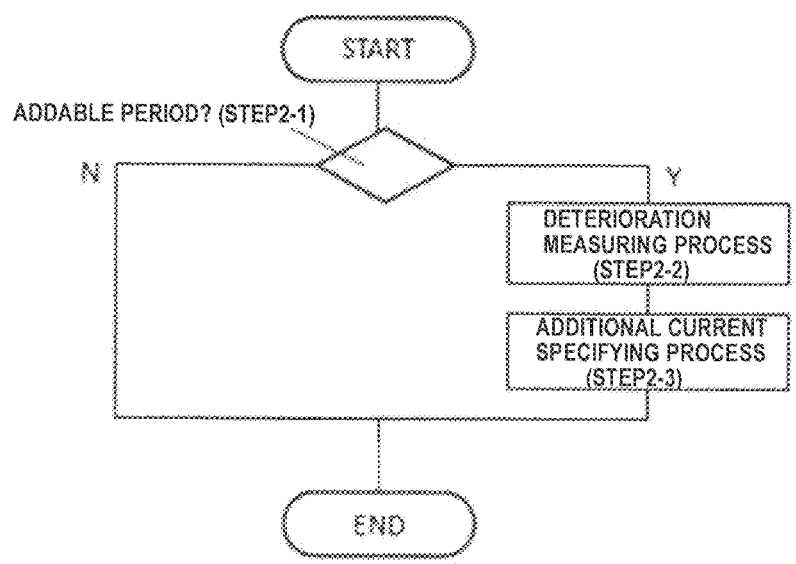
FIG. 9 is a flowchart to show the details of STEP2.
Figure 10:
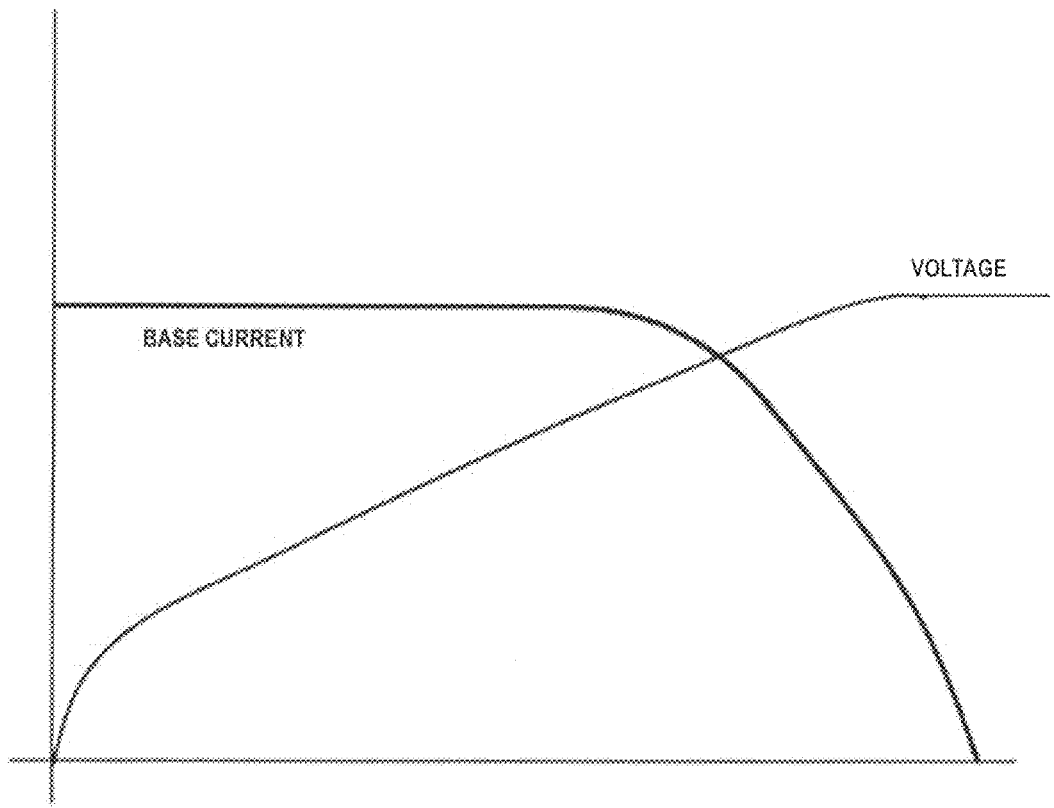
FIG. 10 is a graph showing a relationship between a current and a voltage according to a constant current and constant voltage mode.

STEP2 is the additional current process, and the detail thereof is as shown in FIG. 9.

STEP2-1 is an addable period checking process.

The current and voltage controlling unit 11 checks whether the present moment is in the addable period on the basis of the current voltage and the period specifying information of FIG. 3 that has been stored in the storage unit 14. If in the addable period, the process proceeds to STEP2-2. Otherwise, STEP2 is ended.

Note that the additional current is added not in the initial period and the terminal period but only in the addable period. The reason for this is as follows. In the initial period, the voltage is low. Thus, if an additional current is allowed to flow (if a large current is allowed to flow) in the initial period, the battery 31 deteriorates due to too strong ion bombardment force. If a large current is allowed to flow in the terminal period close to a fully-charged state, on the other hand, it is experientially known that such a large current causes the deterioration of the battery 31.

STEP2-2 is a deterioration measuring process.

The deterioration measuring unit 13 supplies a constant current for a fixed time period (in reality, only for a moment), and then calculates differences between a voltage and a temperature of the battery 31 before the constant current is allowed to flow and a voltage and the temperature of the battery 31 after the constant current has been allowed to flow, respectively. Here, the calculated voltage difference is defined as a voltage difference f1, and the calculated temperature difference is defined as a temperature difference f2.

STEP2-3 is an additional current specifying process.

The additional current specifying process is a process of specifying a value of a current to be added. The performance of the battery 31 is supposed to deteriorate, and deterioration accelerates unless the additional current is set to an appropriate value according to the deterioration condition. Thus, the purpose of this process is to accurately grasp the deterioration condition and to enable the addition of an optimal current according to the deterioration condition.

Regarding this process, there are four kinds of processes in total. Of the four kinds of processes, only one of them may be performed, all of the four kinds of processes may be performed, or any processes selected from the four processes may be combined as desired.

In the first process, the current and voltage controlling unit 11 specifies an additional current value on the basis of the voltage difference f1 and the "current adjustment data based on voltage changes" shown in FIG. 4(*a*). If the voltage difference f1 is "b2 volt(s)," for example, the additional current value of "b7 ampere(s)" is specified.

In the second process, the current and voltage controlling unit 11 specifies an additional current value on the basis of the temperature difference f2 and the "current adjustment data based on temperature changes" shown in FIG. 4(*b*). If the temperature difference f2 is "c6 degree(s)," for example, the additional current value of "c9 ampere(s)" is specified.

In the third process, the current and voltage controlling unit 11 specifies an additional current value on the basis of the voltage difference f1, the "previous voltage difference (f3)" shown in FIG. 5(a), and the additional current data shown in FIG. 5(b). A difference "f4" between the "voltage difference f1" and the "previous voltage difference f3" is calculated, and the additional current value is specified on the basis of the value of f4. If the value of f4 is d1 volt(s), for example, the additional current value of d7 ampere is specified.

In the fourth process, the current and voltage controlling unit 11 specifies an additional current value on the basis of the temperature difference f2, the "previous temperature difference (f5)" shown in FIG. 6(a), and the additional current data shown in FIG. 6(b). A difference "f6" between the "temperature difference f2" and the "previous temperature difference f5" is calculated, and the additional current value is specified on the basis of the value of f6. If the value of f6 is e4 degree(s), for example, the additional current value of e8 ampere(s) is specified.

STEP3 is the power supply process.

The power supplying unit 12 supplies power to the battery module 3 on the basis of the current specified in STEP1-2, STEP1-3, and STEP2.

STEP4 is the terminal period checking process.

The current and voltage controlling unit 11 checks whether the terminal period is ended. If not, the process proceeds to STEP1. If the terminal period is ended, the charging is ended.

It should be noted that the scope of the present invention is not limited by this embodiment. Each of the processes described in the present embodiment may be performed in any device. For example, a process performed by a single device may be performed by a plurality of devices.

Moreover, the system configuration (hardware configuration) described in the present embodiment is provided by way of example only. It is obvious that various configurations may be employed in accordance with its application or purpose.

Furthermore, the data configuration described in the present embodiment is provided by way of example only. It is obvious that various data configurations may be employed in accordance with its application or purpose.

Note that the above-described processing functions can be implemented by a computer. In such a case, there is provided a program according to the present invention that describes the processing details of the functions that should be possessed by the apparatus according to the present invention. Running the program on the computer enables the implementation of the above-described processing functions on the computer. The program describing the processing details according to the present invention can be recorded on a computer-readable recording medium. Examples of such a computer-readable recording medium include a magnetic recording device, an optical disc, a magneto optical recording medium, and a semiconductor memory. Examples of the magnetic recording device include an HDD, an FD, and a magnetic tape. Examples of the optical disc include a DVD (digital versatile disc), a DVD-RAM, a CD-ROM, and a CD-R (recordable)/RW (rewritable). An example of the magneto optical recording device is an MO (magneto optical disk).

In order to distribute the program according to the present invention, a portable recording medium such as a DVD or a CD-ROM on which the program is recorded is marketed, for example. Alternatively, the program may be stored in a storage device of a server computer, and the program may be transferred to other computers from the server computer via a network.

A computer that runs the program according to the present invention stores the program recorded on a portable recording medium or the program transferred from the server computer, for example, in its own storage device. Thereafter, the computer reads out the program according to the present invention from its own storage device, and executes the processing according to the program.

Note that the computer can also read out the program from the portable recording medium and execute the processing according to the program. Alternatively, every time the program is transferred from the server computer, the computer can execute the processing according to the received program.

It is noted that the present invention is not limited only to the above-described embodiment, but various modifications can be made without departing from the scope of the present invention.

The description above merely provides the principle of the present invention. Furthermore, numerous variations and modifications can be made by those skilled in the art. The present invention is not limited to the specific configurations and applications illustrated and described above.

Corresponding modified examples and equivalents are all construed as falling within the scope of the present invention determined by the appended claims and their equivalents.

REFERENCE SIGNS LIST 1 charging apparatus
2 power source
3 battery module
4 cord
5 cable
11 current and voltage controlling unit
12 power supplying unit
13 deterioration measuring unit
14 storage unit
31 battery
32 temperature sensor

The invention claimed is:

1. A fast charging apparatus configured to perform charging of a battery with a constant current until a voltage of the battery reaches a predetermined voltage and performs, after the predetermined voltage is achieved, charging of the battery while controlling the current so as to keep the voltage constant, the charging apparatus comprising:
   additional current specifying means for specifying an additional current addable to the constant current in accordance with a deterioration condition in the battery; and
   additional current charging means for charging the battery with the addable additional current together with the constant current, wherein
   the deterioration condition is specified by a voltage difference obtained by:
   (a) determining a measured voltage difference between voltages measured before and after a single amount of a current is supplied to the battery for a certain period during charging of the battery, and
   (b) determining a difference between the measured voltage difference of step (a) and a previously measured voltage difference measured during charging of the battery.

2. The fast charging apparatus according to claim 1, wherein the deterioration condition is specified by a plurality of voltage differences obtained at different times during charging of the battery.

3. The fast charging apparatus according to claim 1, wherein the additional current charging means performs charging of the battery with the addable additional current in an addable period determined on a basis of the voltage.

4. The fast charging apparatus according to claim 3, wherein:
the battery is a lithium iron phosphate secondary battery; and
the addable period is a period in which the voltage is not less than 2.0 volts and not more than 3.9 volts.

5. A fast charging program configured to perform charging of a battery with a constant current until a voltage of the battery reaches a predetermined voltage and perform, after the predetermined voltage is achieved, charging of the battery while controlling the current so as to keep the voltage constant, the program causing a computer to function as:
additional current specifying means for specifying an additional current addable to the constant current in accordance with a deterioration condition in the battery; and
additional current charging means for charging the battery with the addable additional current together with the constant current, wherein
the deterioration condition is specified by a voltage difference obtained by:
(a) determining a measured voltage difference between voltages measured before and after a single amount of a current is supplied to the battery for a certain period during charging of the battery, and
(b) determining a difference between the measured voltage difference of step (a) and a previously measured voltage difference measured during charging of the battery.

6. A fast charging method of performing charging of a battery with a constant current until a voltage of the battery reaches a predetermined voltage and performing, after the predetermined voltage is achieved, charging of the battery while controlling the current so as to keep the voltage constant, the method performing:
an additional current specifying step of causing additional current specifying means to specify an additional current addable to the constant current in accordance with a deterioration condition in the battery; and
an additional current charging step of causing additional current charging means to charge the battery with the addable additional current together with the constant current, wherein
the deterioration condition is specified by a voltage difference obtained by:
(a) determining a measured voltage difference between voltages measured before and after a single amount of a current is supplied to the battery for a certain period during charging of the battery, and
(b) determining a difference between the measured voltage difference of step (a) and a previously measured voltage difference measured during charging of the battery.

\* \* \* \* \*